United States Patent
Wang et al.

(10) Patent No.: US 12,513,148 B2
(45) Date of Patent: Dec. 30, 2025

(54) METHOD AND SYSTEM FOR GENERATING APPLICATION WHITE LIST

(71) Applicant: INDUSTRIAL TECHNOLOGY RESEARCH INSTITUTE, Hsinchu (TW)

(72) Inventors: Tzy-Shiah Wang, Hsinchu (TW); Shih-Ming Huang, Kaohsiung (TW); Chuan-Yu Cho, Hsinchu (TW); Nien-Chi Liu, Taoyuan (TW); Che-Hao Liu, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 306 days.

(21) Appl. No.: 17/563,647

(22) Filed: Dec. 28, 2021

(65) Prior Publication Data

US 2023/0179601 A1    Jun. 8, 2023

(30) Foreign Application Priority Data

Dec. 3, 2021    (TW) .................................. 110145141

(51) Int. Cl.
*H04L 29/06* (2006.01)
*G06N 20/00* (2019.01)
*H04L 9/40* (2022.01)

(52) U.S. Cl.
CPC ........... *H04L 63/101* (2013.01); *G06N 20/00* (2019.01)

(58) Field of Classification Search
CPC ...... G06N 20/00; G06N 5/025; G06N 3/0464; G06F 21/552; G06F 21/629;
(Continued)

(56) References Cited

U.S. PATENT DOCUMENTS

| | | | |
|---|---|---|---|
| 7,852,756 B2 | 12/2010 | Chen et al. | |
| 7,882,537 B2 | 2/2011 | Okajo et al. | |

(Continued)

FOREIGN PATENT DOCUMENTS

| | | |
|---|---|---|
| CN | 101924761 A | 12/2010 |
| CN | 104361465 A | 2/2015 |

(Continued)

OTHER PUBLICATIONS

TW Office Action in Application No. 110145141 dated May 12, 2022.

(Continued)

*Primary Examiner* — Joseph P Hirl
*Assistant Examiner* — Leynna Truvan
(74) *Attorney, Agent, or Firm* — Maschoff Brennan

(57) ABSTRACT

A method for generating an application white list is applicable to a server. The method is performed by a computing device communicably connected to the server and includes following steps: collecting a network log and a system log of the server, performing an analysis procedure to extract a plurality of application attributes from the network log and the system log with one of the application attributes being an application identifier, performing a training procedure according to the plurality of application attributes to generate a candidate rule, according to a plurality of behaviors in the network log and the system log, calculating the ratio of the number of behaviors among said plurality of behaviors that conforming to the candidate rule to a number of all of said plurality of behaviors, and storing the candidate rule to a whitelist when the ratio falls within a trust interval.

8 Claims, 2 Drawing Sheets

(58) Field of Classification Search
CPC ............ G06F 21/562; G06F 2221/033; G06F 2209/482; G06F 2212/16; G06F 2209/541; G06F 2212/264; G06F 18/24765; H04L 63/101; H04L 12/1831; H04L 12/2642; H04L 29/08675; H04L 1/1628; H04L 12/2807; H04L 41/04; H04L 12/40104; H04L 43/065; H04L 41/0613; H04L 41/0869; H04L 41/0873; H04L 51/046; H04L 65/1063; H04L 67/50; H04L 7/0066; H04L 63/0263; G01G 23/3735; G05B 2219/14055; G05B 2219/23335; G05B 2219/35291; G05B 2219/31092; G05B 2219/34338; G05B 2219/31402; G05B 2219/25065; G05B 2219/25124; G06Q 20/389; G06G 1/0005; H04M 7/0081; G07B 2017/00056; G11B 20/00855; G11B 20/00869; G11B 2020/1275; H04N 21/27; H04N 1/00503; H04N 2201/3202; G06T 2207/20081; G06T 7/0006; H04Q 3/54575; H04W 28/0992; G10H 2240/131

See application file for complete search history.

(56) References Cited

U.S. PATENT DOCUMENTS

| | | |
|---|---|---|
| 8,776,241 B2 | 7/2014 | Zaitsev |
| 9,219,816 B2 | 12/2015 | Grayson |
| 10,819,715 B2 | 10/2020 | David et al. |
| 10,841,281 B2 | 11/2020 | Chiang |
| 2008/0209505 A1 | 8/2008 | Ghai et al. |
| 2010/0269148 A1 | 10/2010 | Almeida et al. |
| 2012/0011560 A1 | 1/2012 | Natarajan et al. |
| 2012/0291138 A1 | 11/2012 | Haga et al. |
| 2013/0152200 A1 | 6/2013 | Alme et al. |
| 2013/0185797 A1 | 7/2013 | Zhou et al. |
| 2018/0027006 A1* | 1/2018 | Zimmermann ..... H04L 63/0227 726/11 |
| 2018/0319015 A1* | 11/2018 | Sinyavskiy ......... G05D 1/0088 |
| 2019/0312899 A1 | 10/2019 | Shulman et al. |
| 2019/0349190 A1 | 11/2019 | Smith et al. |

FOREIGN PATENT DOCUMENTS

| | | |
|---|---|---|
| CN | 102630320 B | 6/2015 |
| CN | 103975337 B | 9/2016 |
| CN | 107409126 A | 11/2017 |
| CN | 108667783 B | 5/2019 |
| TW | 201537379 A | 10/2015 |
| TW | 201835784 A | 10/2018 |
| TW | I724734 B | 4/2021 |
| WO | 2009036896 A2 | 3/2009 |

OTHER PUBLICATIONS

TW Office Action in Application No. 110145141 Dated Aug. 30, 2022.

* cited by examiner

METHOD AND SYSTEM FOR GENERATING APPLICATION WHITE LIST

CROSS-REFERENCE TO RELATED APPLICATIONS

This non-provisional application claims priority under 35 U.S.C. § 119(a) on Patent Application No(s). 110145141 filed in Taiwan, ROC on Dec. 3, 2021, the entire contents of which are hereby incorporated by reference.

BACKGROUND

1. Technical Field

The present disclosure relates to a technique of white list, and more particularly to a method system for generating an application white list.

2. Related Art

The white list technique refers to the method of allowing certain identified entities to access specific services through the setting of rules, or obtaining file access permissions. White lists can be applied to the network or application. The network white list technique can be used to filter emails, advertisements, networks and applications. The application white list technique can block unauthorized programs or malicious software by setting the permitted application control list without affecting the operation of the protected target host.

In the current application white list, it is usually necessary for professionals to formulate the rules of the white list rules according to the field requirements and the current system conditions. In addition to the default rules of the system platform being served as the references, regarding other applications, it is usually necessary for professionals to formulate rules that focus on specific purpose. If the rules are not properly designed or updated regularly, it will easily make a weak point in the system that are exploited by attackers.

In the network white list, the configurable attributes include remote address, remote port, connection direction, user account, etc. In the application white list, the configurable attributes include file path, file name, file hash value, digital signature, publisher, etc. The rule setting of existing white list technique is rough, this is because when the rule is created, only the binary rule of pass or fail can be set in the white list. If the rule definition is incomplete or incorrect, it will cause system execution problems or inconvenience in use. In addition, there are many types of applications, even for experienced professionals, it is still not easy to maintain the white list rules regularly. Furthermore, the rules of the internet white list and the rules of the application white list are usually set separately. It is difficult to generate a white list rule for the network and the application that are related to each other based on the existing rule generation method.

SUMMARY

According to an embodiment of the present disclosure, a method for generating an application white list applicable to a server, wherein the method is performed by a computing device communicably connected to the server and comprises: collecting a network log and a system log of the server; performing an analysis procedure to extract a plurality of application attributes from the network log and the system log, wherein one of the application attributes is an application identifier; performing a training procedure according to the plurality of application attributes to generate a candidate rule; according to a plurality of behaviors in the network log and the system log, calculating a ratio of a number of behaviors among the plurality of behaviors conforming to the candidate rule to a number of the plurality of behaviors; and storing the candidate rule to a whitelist when the ratio falls within a confidence interval.

According to an embodiment of the present disclosure, a system for generating an application white list comprising: a server configured to send a network log and a system log; a communication device communicably connected to the to receive the network log and the system log; and a computing device communicably connected to the communication device and configured to perform a plurality of instructions to generate an application white list applicable to the server, with the plurality of instructions comprising following steps: collecting the network log and the system log; performing an analysis procedure to extract a plurality of application attributes from the network log and the system log, wherein one of the application attributes is an application identifier; performing a training procedure according to the plurality of application attributes to generate a candidate rule; according to a plurality of behaviors in the network log and the system log, calculating a ratio of a number of behaviors among the plurality of behaviors conforming to the candidate rule to a number of the plurality of behaviors; and storing the candidate rule to a whitelist when the ratio falls within a confidence interval.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
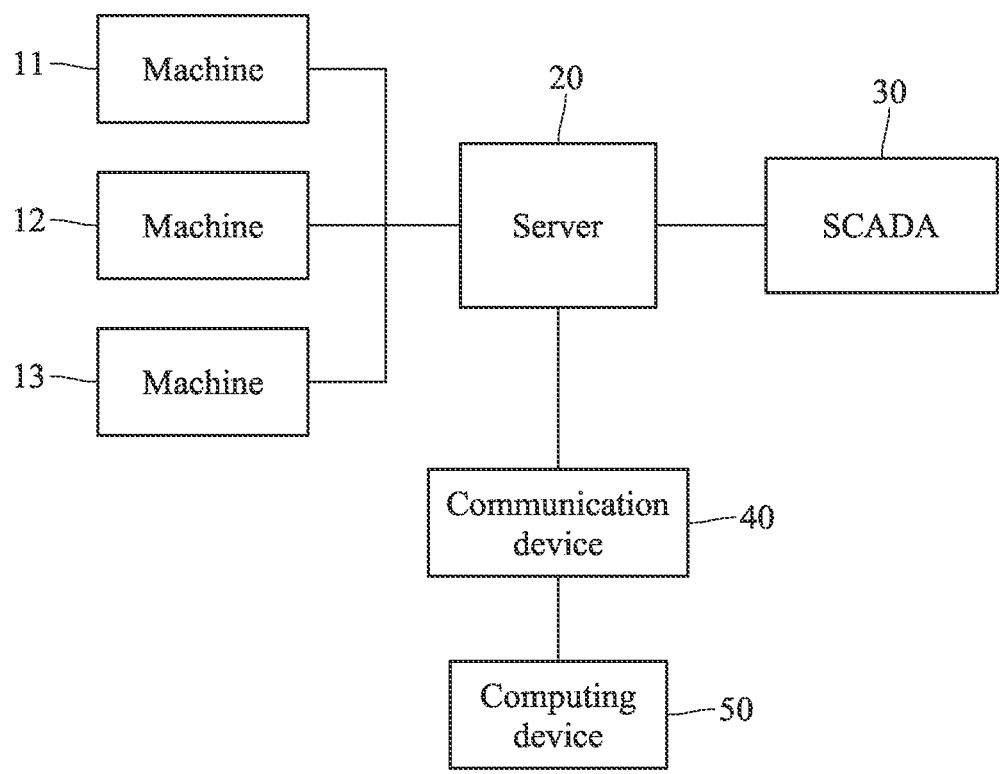
FIG. 1 is a block diagram of a system for generating an application white list and an example of its application environment according to an embodiment of the present disclosure.

FIG. 1 is a block diagram of the system for generating the application white list and an example of its application environment according to an embodiment of the present disclosure. As shown in FIG. 1, the application environment includes three machines 11, 12, 13, a server 20, and a Supervisory Control and Data Acquisition 30 (SCADA). In an example of the application scenario, the production data is sent to the server 20 by these machines 11, 12, 13 at three o'clock in the morning every day; after receiving all of the production data, the server 20 sends these data to the SCADA 30 for backup; and the application white list generated by the method provided in the present disclosure may be adopted by the server 20. In addition, the application white list applicable to machines 11, 12, 13 or applicable to SCADA 30 may be also generated by the method provided in the present disclosure. Moreover, the present disclosure does not limit the operating system applicable to the application white list.

The system for generating the application white list according to an embodiment of the present disclosure includes a server 20, a communication device 40 and a computing device 50. In addition to performing the tasks as mentioned above, the server 20 further sends the network log and the system log. The communication device 40 is communicably connected to the server 20 for receiving the network log and the system log. The computing device 50 is communicably connected to the communication device 40. The computing device 50 is configured to perform a plurality of instructions for generating the application white list applicable to the server 20, and the plurality of instructions corresponds to a plurality of steps as shown in FIG. 2.

Figure 2:
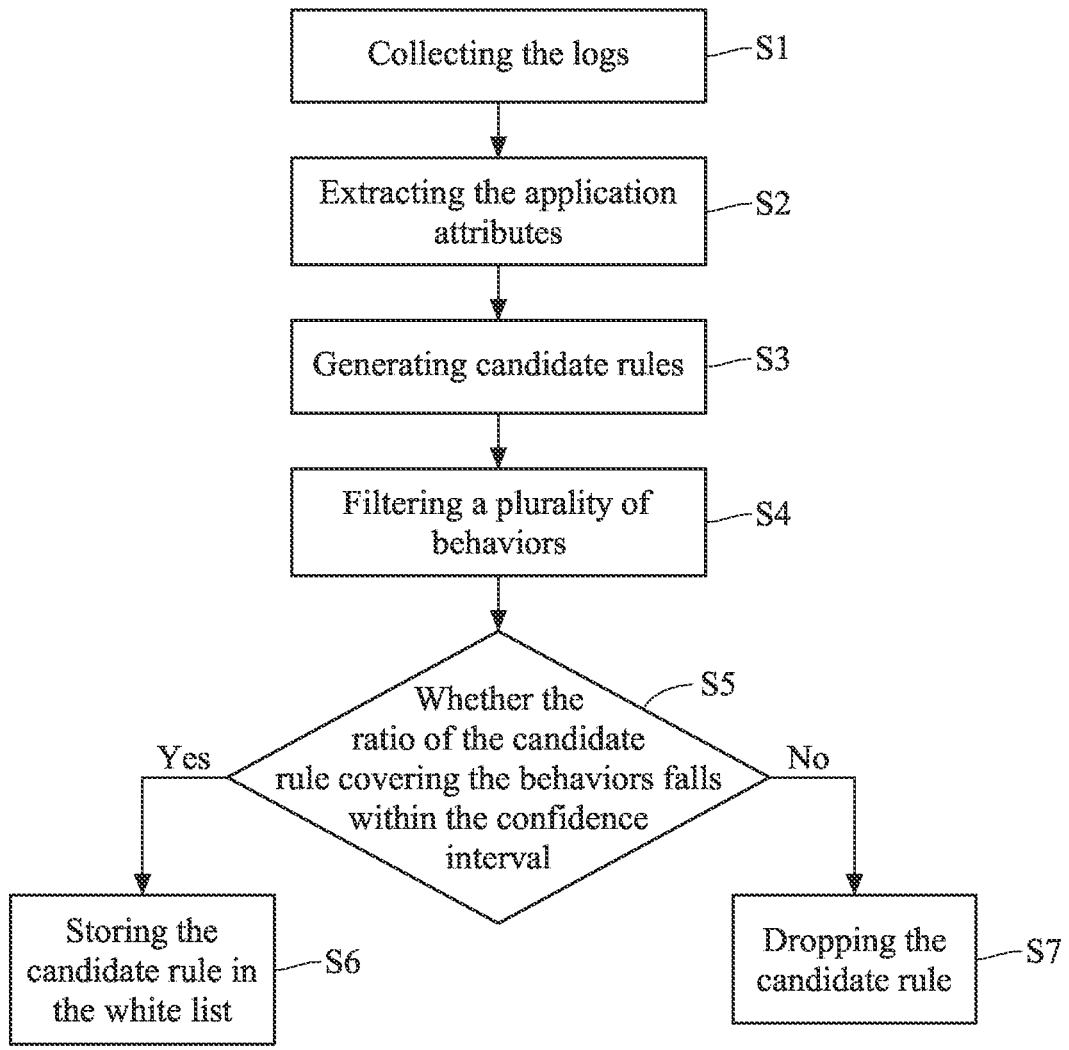
FIG. 2 is a flow chart of a method for generating an application white list according to an embodiment of the present disclosure.

FIG. 2 is a flow chart of the method for generating the application white list according to an embodiment of the present disclosure, and includes steps S1-S7. The implementation of each step is described below.

Step S1 represents "collecting the logs". In an embodiment, the computing device 50 may be, for example, a processor which is capable of performing a packet extraction tool to control the communication device 40 to receive the network log from the server 20. In addition, the processor may use the system log collection tool to control the communication device 40 to receive the system log of the server 20.

In an embodiment, the time span of the collected logs is associated with the normal operation time of the application environment (including machines 11-13, server 20, SCADA 30 and other equipment) of FIG. 1, such as one month. However, the present disclosure does not limit the number of log files collected or the corresponding time span thereof.

Step S2 represents "extracting the application attributes". Specifically, the computing device 50 performs the analysis procedure to extract a plurality of application attributes from the network log and the system log. One of these application attributes is the application identifier (APP_ID). In an embodiment, the application identifier is the hash code of the application.

In an embodiment, the application attributes further include a remote address (IP_REMOTE_ADDRESS) extracted from the network log, a remote port (IP_REMOTE_PORT), a connection direction (inbound or outbound), a user identifier (USER_ID), and a previously-executed procedure sorted out from the system log. The previously-executed procedure generally refers to one or more applications that are executed before the currently executing application (referred to as the current procedure), wherein the current procedure corresponds to the application identifier In an embodiment, regarding each application, step S2 is performed to search the system log for at least one previously-executed procedure performed before this application, and generate at least one identifier corresponding to said at least one previously-executed procedure. The information such as said at least one previously-executed procedure and its previously-executed procedure identifier belongs to a part of the application attributes extracted in step S2.

In an embodiment, it is assumed that the time span of the log file collected in step S1 is one month, and in step S2, the analysis procedure may only extract the application attributes appeared periodically from the log according to a fixed interval, for example, from 3:00 a.m. to 4:00 a.m. every Tuesday. This extraction method may reflect a special behavior of the application in the specific time span, and help to summarize the suitable rules (policy) of the application in the subsequent steps.

Step S3 represents "generating a candidate rule". Specifically, the computing device 50 performs a training procedure to generate a candidate rule according to the application attributes extracted in step S2, the candidate rule is used to denote at least one of the following items associated with an application: source address, destination port, activation time, termination time, execution frequency, previously-executed procedure, activation time of the previously-executed procedure, execution interval of the previously-executed procedure (the length of the time interval between the activation time of the most recently executed previously-executed procedure and the activation time of the current in procedure).

In an embodiment, the training procedure may be, for example, a convolution neural network. During the training process, the name of the previously-executed procedure(s), the number of the previously-executed procedure(s), the activation time and termination time of the previously-executed procedure(s), and the execution frequency, as mentioned above may be used as the input parameters of the training procedure. The training procedure may automatically conclude the time feature or the sequence feature of each application, and thereby generating one or more rules corresponding to the application.

In the past, there is not association analysis and integration between the internet white list rule and the application white list rule. Through the process of steps S1-S3, the behaviors of both internet and application are analyzed in the present disclosure, and thereby integrating the rule generation of internet rule and application rule. Moreover, the restriction condition is automatically customized depending on the environment condition and requirement in the present disclosure. In short, since the internet connection information and characteristics of application execution are collected in step S3 in the present disclosure, the rule generated in step S3 may have a more detailed restriction setting, and thus the white list generated afterwards has a higher protective power.

Since important application attributes from the network log and the system log are extracted respectively in the present disclosure, such as extracting the remote address from the network log, extracting the relative attributes of the previously-executed procedure; in step S3, the training procedure can automatically generate more comprehensive rules, including conditional restrictions on application and internet levels.

The following examples illustrate candidate rules 1 to 5 that can be applied to the server 20 as shown in FIG. 1, but the method and system provided in the present disclosure is not limited to these examples.

candidate rule 1: netsh whitelist infoget.dll add rule "source=192.168.1.10 port=4560 starttime=10800000 endtime=10805000"

candidate rule 2: netsh whitelist infoget.dll add rule "source=192.168.1.11 port=4560 starttime=10800000 endtime=10805000"

candidate rule 3: netsh whitelist infoget.dll add rule "source=192.168.1.12 port=4560 starttime=10800000 endtime=10805000"

candidate rule 4: netsh whitelist infodeliver.dll add rule "desternatyon=192.168.1.30 port=4880 starttime=10920000 endtime=109205000 pprocess=infoget.dll"

candidate rule 5: netsh whitelist XXX connect "source=192.168.1.10 port=4560 starttime=10800000 endtime=10805000 pprocess=XXX pprocesstimeinterval=800000

In candidate rules 1-4, the application identifiers are "inforget.dll" and "infordeliver.dll", the "XXX" in candidate rule 5 represents the hash code of the application.

The white list candidate rule generated by the method provided in present disclosure in step S3 may include sequential parameters (pprocess), so it may provide more customized restriction conditions. For example, in addition to allowing the application to be executed at a specific time, the application may also be restricted to execute the specified previously-executed procedure before execution of itself in the present disclosure. Please refer to the candidate rule 5 in the above example.

Step S4 represents "filtering a plurality of behaviors". In an embodiment, the computing device 50 filters a plurality of behaviors corresponding to the application identifier from the network log and the system log according to the application identifier, these behaviors include any operations of the application corresponding to the application identifier in the logs, such as accessing the file, connecting the internet, etc. In an embodiment, the filtering method of step S4 is to classify the candidate rules of the white list generated in step S3. For example, the candidate rules of the white list generated in step S3 include a rule of "communicating with a certain host", a rule of "opening a certain file", and a rule of "performing a certain application". The filtering method only lists the rule of connection behavior and the rule of file opening. In another embodiment, step S4 is not a necessary step to be performed and will be omitted. In other word, step S4 is served as an advanced option of the implementation of the present disclosure.

Step S5 determines whether the ratio of the candidate rule covering the behaviors falls within the confidence interval. Specifically, among the multiple behaviors being filtered in step S4, the computing device 50 calculates the ratio of the number of behaviors that conform to the candidate rule to the number of all behaviors. Step S6 it performed next if this ratio falls in a confidence interval, whereas step S7 is perform next if this ratio does not fall in the confidence interval. In an embodiment, the confidence interval can be set to three times the standard deviation when the normal distribution is adopted, which is 99.7%. It should be noted that in another embodiment, if step S4 is omitted, step S5 evaluates the candidate rule with each behavior in the system log and network log.

Step S6 represents "storing the candidate rule to the white list". According to the three-sigma rule of thumb, a rule that satisfies 99.7% of behaviors can be regarded as covering almost all behaviors. Therefore, the computing device 50 adds the candidate rule generated in step S3 to the white list as a formal rule. On the contrary, step S7 represents "dropping the candidate rule". If the ratio of the number of behaviors covered by the candidate rule to the total number of behaviors does not fall within the confidence interval, it means that the rule omits normal application behaviors, and therefore this candidate rule needs to be dropped.

In view of the above description, the method and system provided in the present disclosure collects log files generated by the protected host during the normal operations, analyzes operating behaviors and network behaviors of applications, and summarizes the application's operational characteristics and modes, thereby automatically generating the white list rules with detailed settings. The method and system provided in the present disclosure establishes a correlation between the application white list and the network white list, and provides fine-grained rule settings. The method and system provided in the present disclosure may help the white list administrator to create more customized rules of restriction, and provide higher security protection for the execution of the application of the white list. The method and system provided in the present disclosure achieves the effect of program filtering by generating rules that allow the execution of application. The more detailed rules are generated, the more restrictive the system is, and this brings higher security to the system at the same time. The above feature makes the application white list suitable for the deployment in environments that require strict control, such as industrial control, finance, and military environments.

What is claimed is:

1. A method for generating an application white list applicable to a server, wherein the method is performed by a computing device communicably connected to the server and comprises:
   collecting a network log and a system log of the server;
   performing an analysis procedure to extract a plurality of application attributes from the network log and the system log, wherein one of the application attributes is an application identifier;
   performing a training procedure according to the plurality of application attributes to generate a candidate rule, wherein a plurality of input parameters of the training procedure include all of the following: a name of a previously-executed procedure, activation time and termination time of the previously-executed procedure, and an execution frequency, and the candidate rule is configured to denote at least one of a source address, a destination port, an activation time, a termination time, the execution frequency of the application, the previously-executed procedure, and an activation time of the previously-execution procedure associated with an application, wherein the previously-executed procedure is sorted out from the system log and refers to one or more applications that are executed before the application, and the application corresponds to the application identifier;
   according to a plurality of behaviors in the network log and the system log, calculating a ratio of a number of behaviors among the plurality of behaviors conforming to the candidate rule to a number of the plurality of behaviors; and
   storing the candidate rule to a whitelist when the ratio falls within a confidence interval.

2. The method for generating the application white list of claim 1, wherein the candidate rule is configured to denote the previously-executed procedure and a current procedure corresponding to the application identifier, and an execution order of the previously-executed procedure is prior to an execution order of the current procedure.

3. The method for generating the application white list of claim 1, further comprising: before calculating the ratio of the number of the behaviors among the plurality of behaviors conforming to the candidate rule to the number of the plurality of behaviors, filtering the plurality of behaviors corresponding to the application identifier from the network log and the system log according to the application identifier.

4. The method for generating the application white list of claim 1, wherein the plurality of application attributes further comprises at least one of a remote address, a remote connection port, a connection direction, and a user identifier.

5. A system including at least one processor and program code stored in a non-transitory machine readable medium for generating an application white list comprising:
   a server configured to send a network log and a system log;
   a communication device communicably connected to the server to receive the network log and the system log; and
   a computing device communicably connected to the communication device and configured to perform a plurality of instructions to generate an application white list applicable to the server, with the plurality of instructions comprising following steps:
   collecting the network log and the system log;
   performing an analysis procedure to extract a plurality of application attributes from the network log and the system log, wherein one of the application attributes is an application identifier;
   performing a training procedure according to the plurality of application attributes to generate a candidate rule, wherein a plurality of input parameters of the training procedure include all of the following: a name of a previously-executed procedure, activation time and termination time of the previously-executed procedure, and an execution frequency, and the candidate rule is configured to denote at least one of a source address, a destination port, an activation time, a termination time, the execution frequency of the application, the previously-executed procedure, and an activation time of the previously-execution procedure associated with an application, wherein the previously-executed procedure is sorted out from the system log and refers to one or more applications that are executed before the application, and the application corresponds to the application identifier;
   according to a plurality of behaviors in the network log and the system log, calculating a ratio of a number of behaviors among the plurality of behaviors conforming to the candidate rule to a number of the plurality of behaviors; and
   storing the candidate rule to a whitelist when the ratio falls within a confidence interval.

6. The system for generating the application white list of claim 5, wherein the candidate rules is configured to denote the previously-executed procedure and a current procedure corresponding to the application identifier, and an execution order of the previously-executed procedure is prior to an execution order of the current procedure.

7. The system for generating the application white list of claim 5, the plurality of instructions further comprising: before calculating the ratio of the number of the behaviors among the plurality of behaviors conforming to the candidate rule to the number of the plurality of behaviors, according to the application identifier, filtering the plurality of behaviors corresponding to the application identifier from the network log and the system log according to the application identifier.

8. The system for generating the application white list of claim 5, wherein the plurality of application attributes further comprises at least one of a remote address, a remote connection port, a connection direction, and a user identifier.

* * * * *